United States Patent
Dederich

(10) Patent No.: US 10,527,187 B2
(45) Date of Patent: Jan. 7, 2020

(54) VALVE FLOW CONTROL OPTIMIZATION VIA CUSTOMIZATION OF AN INTELLIGENT ACTUATOR

(71) Applicant: Schneider Electric Buildings LLC, Rockford, IL (US)

(72) Inventor: Stanley S. Dederich, Batavia, IL (US)

(73) Assignee: Schneider Electric Buildings LLC, Rockford, IL (US)

(*) Notice: Subject to any disclaimer, the term of this patent is extended or adjusted under 35 U.S.C. 154(b) by 0 days.

(21) Appl. No.: 15/847,965

(22) Filed: Dec. 20, 2017

(65) Prior Publication Data

US 2018/0112791 A1  Apr. 26, 2018

Related U.S. Application Data

(63) Continuation of application No. 14/296,024, filed on Jun. 4, 2014, now Pat. No. 9,890,870, which is a continuation of application No. PCT/US2011/067910, filed on Dec. 29, 2011.

(51) Int. Cl.
*G05D 7/00* (2006.01)
*G05D 11/00* (2006.01)
*F16K 31/04* (2006.01)
*F16K 37/00* (2006.01)

(52) U.S. Cl.
CPC ........ *F16K 31/046* (2013.01); *F16K 37/0041* (2013.01); *F16K 37/0083* (2013.01); *Y10T 137/0318* (2015.04); *Y10T 137/0357* (2015.04); *Y10T 137/86389* (2015.04)

(58) Field of Classification Search
USPC ........................................................ 700/282
See application file for complete search history.

(56) References Cited

U.S. PATENT DOCUMENTS

| | | | |
|---|---|---|---|
| 4,585,205 A | 4/1986 | Coppola | |
| 4,845,416 A * | 7/1989 | Scholl | G05B 19/19 318/600 |
| 6,202,680 B1 | 3/2001 | Irokawa et al. | |
| 6,975,934 B2 | 12/2005 | Ishikawa et al. | |
| 7,111,643 B2 | 9/2006 | Oh | |

(Continued)

FOREIGN PATENT DOCUMENTS

CN  1710307 A  12/2005
DE  4019503 A1  1/1992

*Primary Examiner* — Md Azad
(74) *Attorney, Agent, or Firm* — Locke Lord LLP

(57) ABSTRACT

A valve arrangement including a valve and a valve actuation arrangement is provided. The valve has a known flow profile. The valve includes a valve member and a valve stem operably coupled to the valve member for adjusting the position of the valve member. The valve actuation arrangement is operably coupled to the valve stem. The valve actuation arrangement includes a drive arrangement and a control arrangement. The drive arrangement is operably coupled to the valve stem and configured to adjust an actual stem position of the valve stem based on an actual stem positional signal. The control arrangement is configured to generate the actual stem positional signal. The control arrangement is configured to generate the actual stem positional signal based on an input control signal representing a desired stem position based on a desired flow profile being different than the known flow profile.

7 Claims, 6 Drawing Sheets

(56) References Cited

U.S. PATENT DOCUMENTS

| | | |
|---|---|---|
| 7,178,783 B2 | 2/2007 | Tuin et al. |
| 2001/0032518 A1 | 10/2001 | Boger et al. |
| 2005/0273204 A1* | 12/2005 | Hansen .................. G05D 7/005 |
| | | 700/282 |
| 2009/0125154 A1 | 5/2009 | Yli-Koski |
| 2009/0149969 A1 | 6/2009 | Slupphaug et al. |
| 2009/0024037 A1 | 9/2009 | Elshafei et al. |
| 2009/0240376 A1 | 9/2009 | Elshafei et al. |
| 2011/0071966 A1 | 3/2011 | Holley et al. |
| 2011/0114304 A1 | 5/2011 | Keller |
| 2012/0138826 A1 | 6/2012 | Morris |
| 2014/0174562 A1* | 6/2014 | Folk ...................... F16K 31/365 |
| | | 137/488 |

* cited by examiner

VALVE FLOW CONTROL OPTIMIZATION VIA CUSTOMIZATION OF AN INTELLIGENT ACTUATOR

CROSS-REFERENCE TO RELATED PATENT APPLICATIONS

This application for patent is a continuation of U.S. application Ser. No. 14/296,024, filed Jun. 4, 2014, which is a continuation of International Application No. PCT/US2011/067910, filed Dec. 29, 2011, the entire teachings and disclosure of the foregoing applications being incorporated herein by reference thereto. This application is also related in subject matter to and incorporates herein by reference commonly-assigned U.S. application Ser. No. 15/847,963 entitled "Valve Flow Control Optimization Via Customization of an Intelligent Actuator" filed concurrently herewith.

FIELD OF THE INVENTION

This invention generally relates to valve actuators for controlling the opening and closing of valves to control a flow rate of fluid through the valve and associated systems.

BACKGROUND OF THE INVENTION

Valves are used to adjust the fluid flow through a system. One particular system where valves are used to control fluid flow are in heating, ventilating and air-conditioning systems (HVAC systems). For instance, liquid valves may be used to regulate water flowing through a heating system or valves in the form of dampers may be used to regulate cooled or heated air into an environment that is being conditioned.

At present, most HVAC systems have HVAC control systems that include end control devices, such as valve actuators, that control mechanical adjustment of end control elements, such as valves, in response to a control signal from an HVAC controller or building management system (BMS). Typically, a control signal is sent to the valve actuator and the valve actuator adjusts its output to change the position of the valve member of the valve (or damper) between a closed or open position in an open-close, floating, or modulating control manner. It is assumed that these changes in position of the end control element will result in a change in energy delivered to a controlled zone (via chilled or hot water heat transfer or conditioned air).

Unfortunately, valves do not have the same flow response curve from one type or size of valve to another type or size of valve. The same applies to dampers. Therefore, not all valves provide exactly the same flow vs. controlled valve position. Many HVAC control systems base their control signal that is sent to the valve actuator as if the valve has a flow profile that is an equal percentage flow curve. Unfortunately, because many, if not most, valves do not have a same flow profile and particularly not a flow profile that follows the equal percentage flow curve, tremendous amounts of error in controlling the flow of the valve exists.

For instance, for an equal percentage flow curve, the control system will typically expect about a 15% valve flow as a percentage of valve rated flow (Cv or Kv) when the valve is at a 50% valve position (i.e. half way between open and closed). In some families of valves (i.e. same style valve just change in valve size), the actual valve flow as a percentage of valve rated flow at the 50% valve position can range between 6% and 60% depending on the valve size. This variation from valve to valve can provide a significant error in the system considering the high accuracy of the command to the valve actuator from the HVAC controller.

These inherent errors from the theoretical flow curve (typically the equal percentage flow curve) can often cause system designers to oversize valves to insure that the system can provide enough flow rate under all conditions. This is because an undersized valve can never provide enough flow, and consequently carry enough energy, to meet all application needs. This habitual over sizing of the valves tends to cause the need for larger pumps, requiring more energy to supply the heating/cooling needs of the facility. Larger valves also tend to require larger heater radiator coils, raising the costs to install the actual HVAC system.

A further problem relating to oversized valves or significant error between the theoretical flow profile used by the HVAC control system and the actual flow profile of the valve is that the HVAC control system may cause significant overshoot in the control of the HVAC system such that the system cycles back and forth between high levels of heating followed by high levels of cooling to provide the desired conditioning of a zone. While the high level HVAC control systems may have sufficient feedback control to properly heat or cool the zone or environment, the system will be continuously fighting against itself causing inefficient operation of the HVAC system.

BRIEF SUMMARY OF THE INVENTION

Embodiments of the present invention allow for more intelligent control of a valve based on the known flow profile of the valve. The methods and apparatuses here allow for correlation of an input control signal based on a desired flow profile to an actual valve stem positional signal based on the known flow profile of the valve being controlled.

In a particular method according to an embodiment of the present invention, a method of operating a valve actuator arrangement for a valve having a known flow profile is provided. The method includes receiving a first input control signal representing a first desired stem position based on a first desired flow profile, the first desired flow profile being different than the known flow profile, the first desired stem position having a corresponding first theoretical stem positional signal and a corresponding first theoretical flow rate; and generating an actual first stem positional signal different than the first theoretical stem positional signal corresponding to an actual first stem position providing the first theoretical flow rate based on the known flow profile.

In an embodiment of the method, the method further comprises providing the actual stem positional signal to an actuation arrangement and driving the actuation arrangement based on the actual stem positional signal.

In one embodiment, the desired flow profile is selected from the group consisting of an equal percentage flow profile, a fast acting flow profile, and a linear flow profile. It could also be an equal percentage modified flow profile.

In one embodiment, the desired flow profile is a user custom defined flow profile. In one embodiment, the user defined flow profile is selected from the group consisting of A) a reduced rate flow profile is a flow profile reduced by a percentage reduction factor such that the reduced rate profile is less than a full flow capability of the valve and B) a flow limiting profile that is a flow profile capped at a less than a full flow capability.

In another embodiment, the method allows for switching between modes using different correlation mechanisms such as between different known flow profiles for different valves or for different desired flow profiles. The method further includes receiving a second input control signal representing a second desired stem position based on a second desired flow profile, the second desired flow profile being different than the known flow profile and the first desired flow profile, the second desired stem position having a corresponding second theoretical stem positional signal and a corresponding second theoretical flow rate; and generating an actual second stem positional signal different than the second theoretical stem positional signal corresponding to an actual second stem position providing the second theoretical flow rate based on the known flow profile.

In a more particular implementation, the steps of:

receiving a first input control signal representing a first desired stem position based on a first desired flow profile, the first desired flow profile being different than the known flow profile, the first desired stem position having a corresponding first theoretical stem positional signal and a corresponding first theoretical flow rate; and generating an actual first stem positional signal different than the first theoretical stem positional signal corresponding to an actual first stem position providing the first theoretical flow rate based on the known flow profile;

occur during a first mode. The steps of:

receiving a second input control signal representing a second desired stem position based on a second desired flow profile, the second desired flow profile being different than the known flow profile and the first desired flow profile, the second desired stem position having a corresponding second theoretical stem positional signal and a corresponding second theoretical flow rate;

generating an actual second stem positional signal different than the second theoretical stem positional signal corresponding to an actual second stem position providing the second theoretical flow rate based on the known flow profile;

occur during a second mode. The method further comprising switching from the first mode to the second mode.

In another embodiment, the step of:

generating an actual first stem positional signal different than the first theoretical stem positional signal corresponding to an actual first stem position providing the first theoretical flow rate based on the known flow profile;

includes using a first lookup table or equivalent mathematical equation correlating the first input control signal to the actual first stem positional signal to determine the actual first stem positional signal. Step of:

generating an actual second stem positional signal different than the second theoretical stem positional signal corresponding to an actual second stem position providing the second theoretical flow rate based on the known flow profile;

includes using a second lookup table or equivalent mathematical equation correlating the second input control signal to the actual second stem positional signal to determine the actual second stem positional signal.

In one embodiment, the first and second lookup tables or equivalent mathematical equations are stored in the valve actuation arrangement at a same time. The method further includes switching from the second mode to the first mode.

In one embodiment, the step of generating an actual first stem positional signal includes correlating the first input control signal to the actual first stem positional signal.

In one embodiment, correlating the first input control signal to the actual first stem positional signal includes using a lookup table or equivalent mathematical equation.

In one embodiment, the step of generating an actual first stem positional signal includes correlating the first input control signal to the actual first stem positional signal; and the step of generating an actual second stem positional signal includes correlating the second input control signal to the actual second stem positional signal.

In one embodiment of the invention, a valve arrangement including a valve and a valve actuation arrangement is provided. The valve has a known flow profile. The valve includes a valve member and a valve stem operably coupled to the valve member for adjusting the position of the valve member. The valve actuation arrangement is operably coupled to the valve stem. The valve actuation arrangement includes a drive arrangement and a control arrangement. The drive arrangement is operably coupled to the valve stem and configured to adjust an actual stem position of the valve stem based on an actual stem positional signal. The control arrangement is configured to generate the actual stem positional signal. The control arrangement is configured to generate the actual stem positional signal based on an input control signal representing a desired stem position based on a desired flow profile being different than the known flow profile.

In one embodiment, the known flow profile is different than the desired flow profile in that in at least one same valve stem position for the known and desired flow profiles each flow profile has a different flow rate.

In one embodiment, the desired flow profile is an equal percentage flow profile.

In one embodiment, the control arrangement includes a lookup table or equivalent mathematical equation that correlates the input control signal to the actual stem positional signal.

In one embodiment, the valve actuation arrangement includes a master controller, an intermediate signal translator device and a valve actuator including the drive arrangement. The intermediate signal translator device is interposed between the master controller. The master controller is configured to generate the input control signal. The intermediate signal translator is configured to generate the actual stem positional signal based on the input control signal from the master controller.

In one embodiment, the master controller has an output interface. The valve actuator has an input interface. The intermediate signal translator has an input interface coupled to the output interface of the master controller. The intermediate signal translator has an output interface coupled to the input interface of the valve actuator. The valve actuator is packaged as a first unit. The intermediate signal translator is packaged as a second unit independent of the first unit. This allows for retrofit in existing systems.

In one embodiment, the intermediate signal translator is programmed with a lookup table or equivalent mathematical equation configured to correlate the input control signal to the actual stem positional signal.

In one embodiment, the control arrangement is further configured to generate the actual stem positional signal based on a second input control signal representing a second desired stem position based on a second desired flow profile being different than the known flow profile and different than the first desired flow profile.

In one embodiment, the control arrangement is switchable between generating the actual stem positional signal based on the desired flow profile and generating the actual stem positional signal based on the second desired flow profile.

In one embodiment, the control arrangement is configured to correlate the input control signal to the actual stem positional signal using a first lookup table or equivalent mathematical equation and configured to correlate the second input control signal to the actual stem positional signal using a second lookup table or equivalent mathematical equation different than the first lookup table or equivalent mathematical equation.

In one embodiment, the control arrangement is configured correlate the input control signal to the actual stem positional signal using a lookup table or equivalent mathematical equation.

In one embodiment, the control arrangement includes a master controller and a valve actuator operably coupled to the master controller. The valve actuator includes the drive arrangement. The valve actuator is packaged as a first unit. The master controller is packaged as a second unit independent of the first unit. The master controller configured to generate the input control signal and then correlate the input control signal to the actual stem positional signal.

In one embodiment, the control arrangement includes a master controller and a valve actuator. The valve actuator includes an actuator controller operably coupled to the master controller. The valve actuator is packaged as a first unit including the actuator controller and the drive arrangement. The master controller is packaged as a second unit independent of the first unit. The master controller is configured to generate the input control signal and the actuator controller is configured to receive the input control signal and correlate the input control signal to the actual stem positional signal.

In another embodiment, a valve actuation arrangement operably couplable to a valve having a known flow profile is provided. The valve includes a valve member and a valve stem operably coupled to the valve member for adjusting the position of the valve member. The valve actuation arrangement includes a drive arrangement and a control arrangement. The drive arrangement is operably couplable to the valve stem and configured to adjust an actual stem position of the valve stem based on an actual stem positional signal. The control arrangement is configured to generate the actual stem positional signal to control operation of the drive arrangement. The control arrangement is configured to generate the actual stem positional signal based on an input control signal representing a desired stem position based on a desired flow profile being different than the known flow profile.

In another embodiment, a method of programming a valve actuation arrangement for a valve having a known flow profile is provided. The method includes obtaining a correlation table correlating an input control signal representing a desired stem position based on a desired flow profile with an actual stem positional signal based on the known flow profile. The desired flow profile being different than the known flow profile. The method further includes storing the correlation table in the valve actuation arrangement.

In a more particular method, the method includes sending a valve identifier identifying the valve to a host; sending a desired flow profile identifier to the host; and receiving the correlation table.

The method may further include obtaining a second correlation/lookup table or equivalent mathematical equation correlating an input control signal representing a second desired stem position based on a second desired flow profile with an actual stem positional signal based on the known flow profile. The second desired flow profile is different than the known flow profile and the desired flow profile. The method further including storing the second correlation table in the valve actuation arrangement.

Preferably, the correlation table and second correlation table are both stored in the valve actuation arrangement.

In another method, a method of generating a correlation table correlating an input control signal to an actual stem position signal for a valve having a known flow profile is provided. The method includes receiving a valve identifier identifying a valve, the valve having a known flow profile from a user; receiving a desired flow profile identifier from a user; and generating a correlation table correlating an input control signal representing a desired stem position based on the desired flow profile with an actual stem positional signal based on the known flow profile, the desired flow profile being different than the known flow profile; and sending the correlation table to the user.

The method may further include receiving a desired flow profile identifier includes receiving user defined desired flow profile information.

A further method of controlling a valve actuator for a valve having a known flow profile is provided. The method includes receiving an input control signal representing a desired flow output based on a desired flow profile, the desired flow profile being different than the known flow profile; correlating the desired flow output to a known stem positional signal that will produce the desired flow output; and generating the known stem positional signal.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
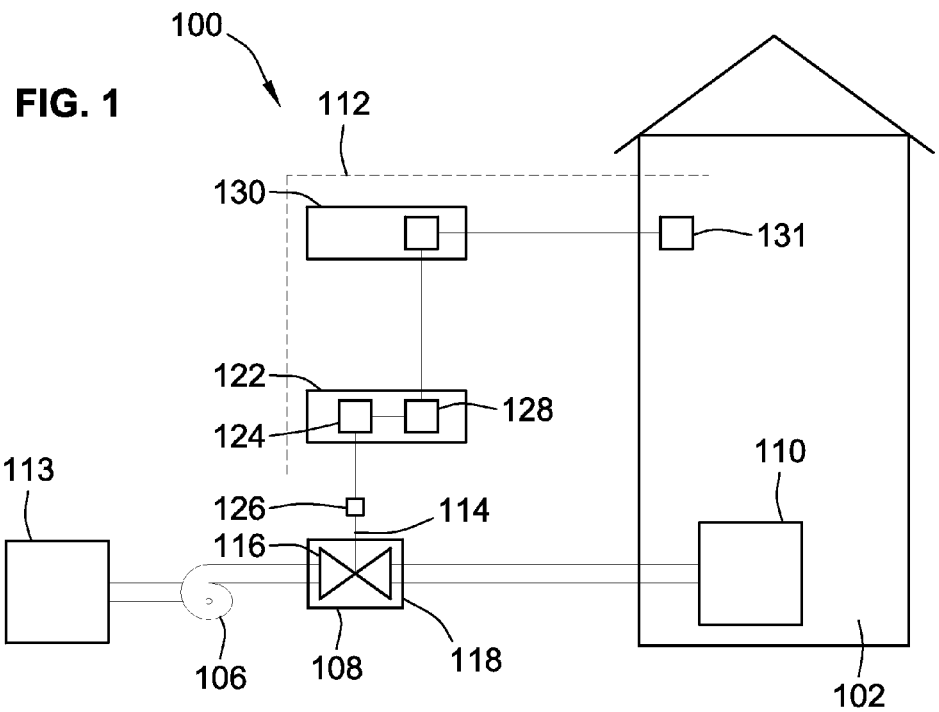
FIG. 1 is a schematic illustration of an HVAC system using a valve and valve actuation arrangement according to embodiments of the present invention.

FIG. 1 illustrates a simplified schematic illustration of a HVAC system 100 used to condition an environment 102 according to embodiments of the present invention. The HVAC system 100 could use either flowing water or air as a fluid for conditioning environment 102.

The HVAC system 100 includes a fluid source 113 and a pump 106 for pumping the fluid used to condition the environment 102. A valve 108 is interposed between the fluid source 113 and the environment to control the flow of the fluid toward the environment and particularly to a location where the fluid is used to condition the environment. For instance, in FIG. 1, the valve 108 controls flow of water to a radiator 110 or other heat transfer device for cooling or heating the environment 102. In such an embodiment, the valve 108 could take the form of a water flow control valve and the fluid source 113 could include heating coils for heating the water prior to being passed to radiator 110. In alternative embodiments, the valve 108 could take the form of a damper and the fluid source 113 could be a furnace or air-conditioner while the outlet (i.e. radiator 110) could be in the form of a vent in fluid communication with the environment.

While not illustrated, the HVAC system 100 could have different zones that are all supplied with fluid from the fluid source 113.

Figure 5:
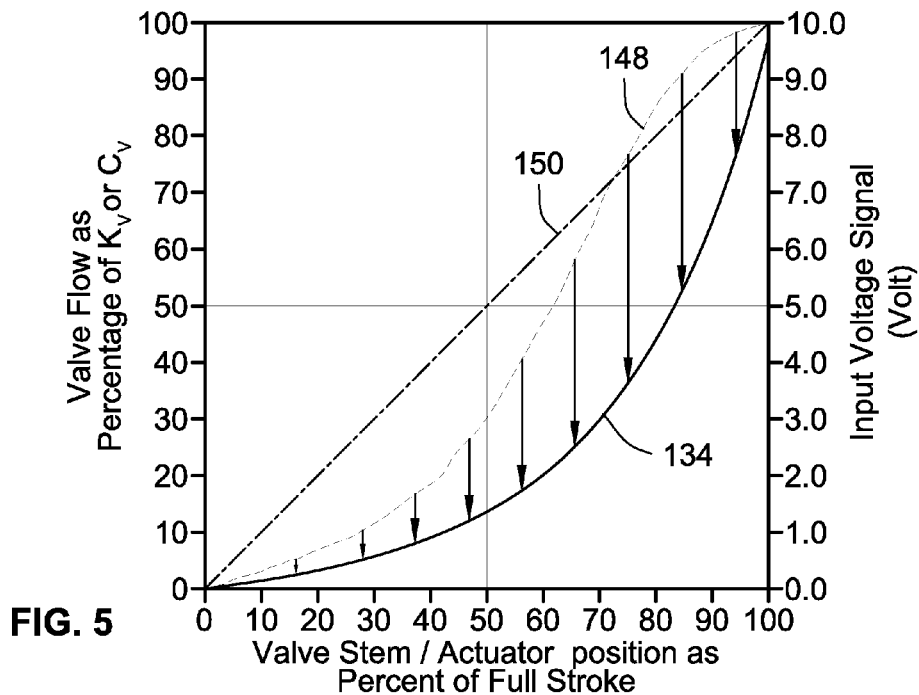
FIG. 5 is a plot showing how the valve actuation arrangements can cause a valve having a known profile to emulate a desired flow profile.

To control operation of the valve 108, the HVAC system 100 includes a valve actuation arrangement 112 operably coupled to the valve 108. In the illustrated embodiment, the valve actuation arrangement 112 is operably coupled to a valve stem 114 that is operably coupled to a valve member 116 of the valve. Movement of the valve stem 114 operably moves the valve member 116 relative to a valve body 118. Movement of the valve member 116 adjusts the amount of flow permitted through the valve 108 between a minimum flow (typically no flow) and a maximum flow. The valve stem 114 may rotate the valve member 116 about a rotational axis, axially move the valve member 116 along a linear axis, may open and close louvers or other members if the valve 108 is in the form of a damper, etc. The valve 108 will have a known flow profile 148 (see FIG. 5) that relates fluid flow relative to stem position. In FIG. 5, the flow profile 148 of a valve 108 is expressed in terms of percentage of maximum flow as a function of percentage of full stroke.

In the embodiment of FIG. 1, the valve actuation arrangement 112 includes a valve actuator 122 operably coupled to the valve 108 that physically controls motion of the valve stem 114, and consequently, the valve member 116. The valve actuator 122 includes a drive mechanism 124 that can include, at a minimum, a drive motor for driving the valve stem 114. The drive mechanism 124 may also include gears and/or a transmission for translating an output of the motor to the valve stem 114. A coupling 126 is provided between the motor and/or transmission of the valve actuator 122 and the valve stem 114 to assist in operably coupling the valve actuator 122 to the valve stem 114. The valve actuator 112 and typically the drive mechanism may include electronic control mechanisms (which may include a microprocessor and some storage media) for controlling the motor to operably drive the valve stem 114, and consequently the connected valve member 116 relative to the valve body 118, in response to an actual stem positional signal. The electronics associated with the drive mechanism 124 may allow for particularly positioning the valve stem 114 between opposed ends of the full stroke of the valve 108. In some embodiments, the drive mechanism is in the form of a stepper motor that separates the full stroke into independent equal sized steps. Alternatively, the drive mechanisms can include a synchronous motor or DC motor controlled by timing.

The valve actuator 122, in the illustrated embodiment, also include an actuator controller 128 operably coupled to the drive mechanism 124 operably configured to generate the actual stem positional signal. The actuator controller 128 of the illustrated embodiment is configured to receive an input control signal from a master controller 130. The actuator controller 128 may include a microprocessor and storage media. The drive mechanism 124 controls the valve stem based on this actual stem positional signal sent from the actuator controller 128.

The master controller 130 is operably configured to generate the input control signal that is operably used to control positioning of the valve stem 114 to a specific position. This specific position is intended to properly adjust fluid flow through the valve 108 to adjust the amount of conditioning that occurs within the environment 102, for example, the amount energy added during a heating operation. Typically, the master controller 130 will be operably connected to a sensor 131 within the environment 102 to allow the master controller 130 to determine how to adjust control of the HVAC system 100 to properly condition environment 102. Typically, sensor 131 will be a temperature sensor positioned within the environment 102. The sensor 131 may also be or include other sensors for sensing humidity within the environment 102. Further, the master controller 130 may control an HVAC system for an entire building that has multiple zones for different environments, such as different rooms, floors, etc. Thus, the master controller 130 may communicate with numerous sensors.

Figure 3:
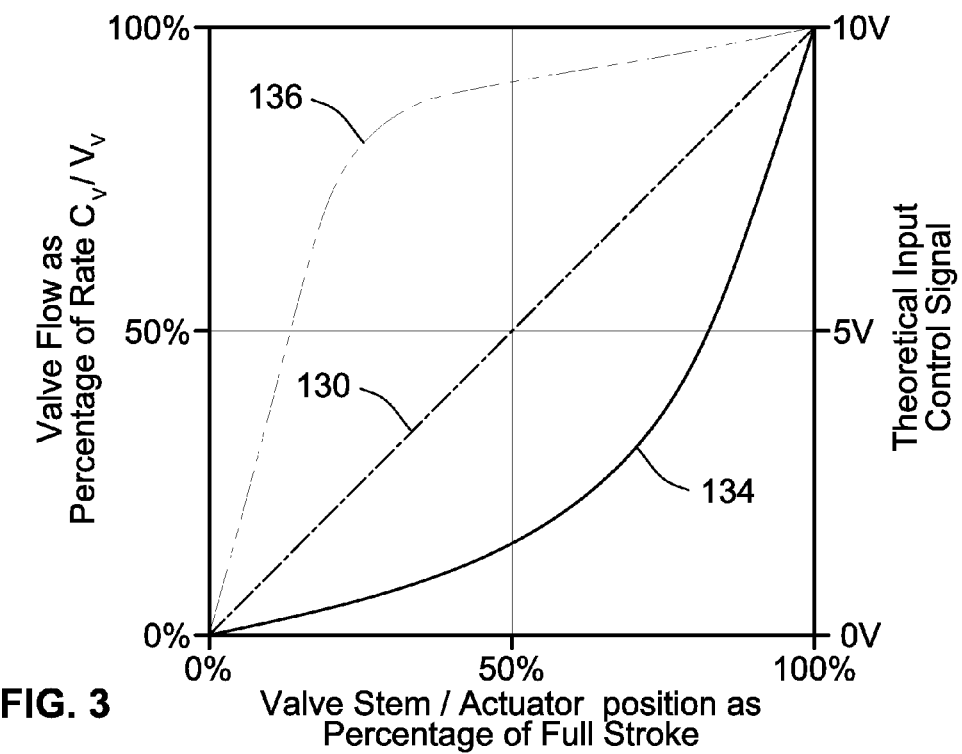
FIG. 3 is a plot of theoretical flow profiles used for master controllers.

Typically, the master controller 130 will be programmed to generate the input control signal based on a theoretical flow profile of a desired valve controlling the fluid flow. FIG. 3 is a plot of theoretical flow profiles that are generally used for programming master controllers 130. Flow profile 134 is an equal percentage flow profile (hereinafter "equal percentage flow profile 134"). Flow profile 136 is a fast acting flow profile (hereinafter "fast acting flow profile 136"). Flow profile 138 is a linear flow profile (hereinafter "linear flow profile 138").

Ideally programming of the master controller 130 will typically use a theoretical flow profile, such as one of these flow profiles 134, 136, 138, or other theoretical flow profile, that the programmer believes best approximates the actual flow profile of the valve within the HVAC system. This allows the end program to correctly determine the desired position of the valve stem so as to provide the expected amount of fluid flow.

In this embodiment, the actuator controller 128 may individually be considered or may be in combination a control arrangement configured to generate the actual stem positional signal, with the actual stem positional signal being based on the input control signal representing the desired stem position based on the desired flow profile.

Figure 4:
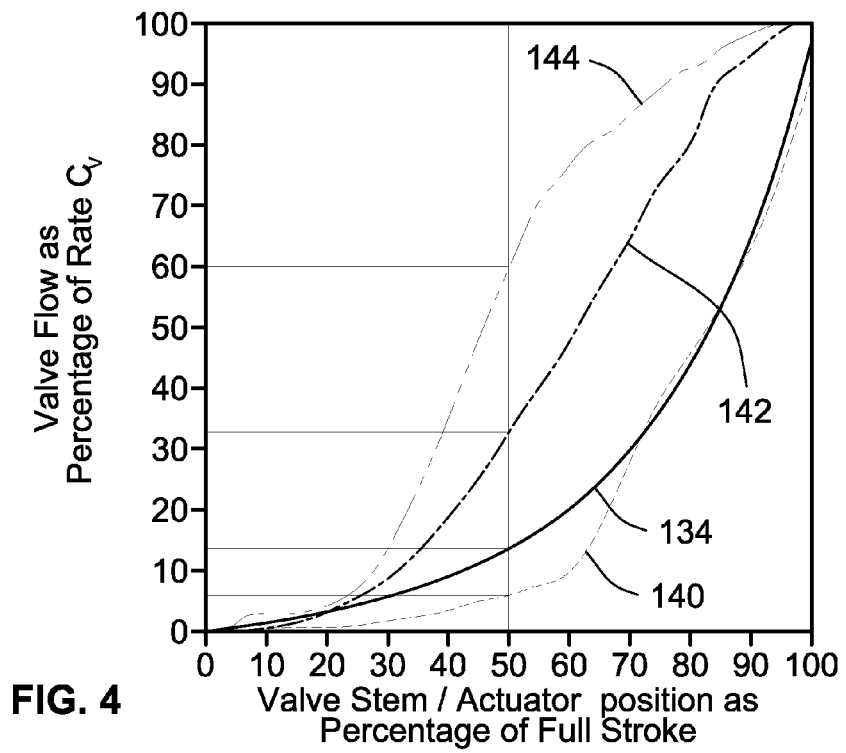
FIG. 4 is a plot of actual flow profiles for known valves.

FIG. 4 illustrates that, unfortunately, even within a line of similarly designed valves (varying typically only in size), the flow profiles thereof do not always maintain a common shape. FIG. 4 plots first, second and third known flow profiles 140, 142, 144 for different valves within a single product line but merely having different valve sizes (i.e. full flow capacities) in addition to the equal percentage flow profile 134 discussed above. It can be seen that there is significant variation between the three different known flow profiles 140, 142, 144 as well as equal percentage flow profile 134. The significant variation from the theoretical flow profile, i.e. the equal percentage flow profile 134 in this example, provides significant error in the system when the master controller 130 is programmed to generate an input control signal based on a theoretical flow profile that does not match or come close to matching the actual flow profile of the valve being controlled.

With reference to FIG. 4, if the master controller 130 determined, for example, that it needed to generate a valve stem positional signal of 50% of full stroke, significantly different percentage flow rates would be generated depending on which valve was being controlled. A true equal percentage flow profile would have a percentage flow rate of approximately 15% and in the lowest case, first known flow profile 140 would have a percentage flow rate of approximately 6% while in the highest case, third known flow profile 140 would have a percentage flow rate of approximately 60%. As can be seen, there will be a significant difference and significant error in the actual amount of energy that will be transferred to or from the environment in view of the variation in the flow profiles between different valves.

It should be noted that while FIG. 4 illustrates that there is large variation from one valve size to another, there is typically much less variation between individual valves of a same exact size. As such, when a flow profile of a given valve is determined, the rest of the valves similarly configured should have substantially the same flow profile.

Embodiments of the present invention provide intelligent control to the valve actuation arrangement 112 that allows for specific tailoring of the valve actuation arrangement 112 based on the known flow profile of the specific valve 108 coupled to the valve actuation arrangement 112, and at a minimum the particular valve actuator 122 of the valve actuation arrangement 112 controlling the particular valve 108.

With additional reference to FIG. 5, in one embodiment, such as in FIG. 1, the actuator controller 128 of the valve actuator 122 is configured such that it can be user programmed based on the known flow profile 148 of valve 108 that the valve actuator 122 is controlling such that the valve 108 will emulate that of a desired flow profile, such as equal percentage profile 134. Therefore, when the actuator controller 128 receives an input control signal from the master controller 130 representing a desired stem position based on the desired flow profile used by the programming of the master controller 130, i.e. the equal percentage flow profile 134 for example, the actuator controller 128 will correlate that input control signal to an actual stem positional signal that represents a different actual stem position than the desired stem position. The actuator controller 128 will then generate the actual stem positional signal that will control the drive arrangement 124 to position the valve stem 114 in the proper orientation and provide the desired percentage flow rate.

More particularly, the actuator controller 128 is configured to generate an actual valve stem positional signal that will place the valve stem 114 of the valve 108 in the proper position to provide the desired flow rate that corresponds to the desired stem position.

Typically, the input control signal from the master controller 130 is a linear analog signal. In some embodiments, the linear signal is a linear voltage signal between 0 and 10 volts DC or a linear current signal between 4 and 20 mA. In some embodiments, this signal could be a digital, such as via a communications network.

In FIG. 5, a theoretical response curve 150 is plotted which illustrates the theoretical response curve that the master controller 130 is programmed to believe the actuator will exhibit based on the linear input control signal generated by the master controller 130. More particularly, theoretical response curve 150 represents the input voltage as a function of percentage of valve stem position.

In one embodiment, the actuator controller 128 will be programmed to use a lookup table or equivalent mathematical equation that correlates the input control signal sent from the master controller 130 based on the theoretical desired flow profile underlying the programming of the master controller 130 to the actual stem positional signal that represents the same flow rate based on the known flow profile 148 of valve 108. Again, the known flow profile 148 of the valve 108 is typically different than the desired flow profile 134. However, the actuator controller 128 may use other mechanisms or programming to perform the correlation. The actuator controller 128 will then generate the actual stem positional signal which corresponds to the actual stem position necessary to provide the theoretical flow rate the master controller 130 based on the actual known flow profile 148 of the valve 108. This signal is then sent to the drive arrangement 126. An equivalent mathematical equation to a lookup table can be generated, in one way, by generating the data points of the lookup table and then fitting a curve to the data points and generating a regression equation. While following embodiments may be discussed interims only of a lookup table generally, these embodiments could also use an equivalent mathematical equation instead.

Figure 6:
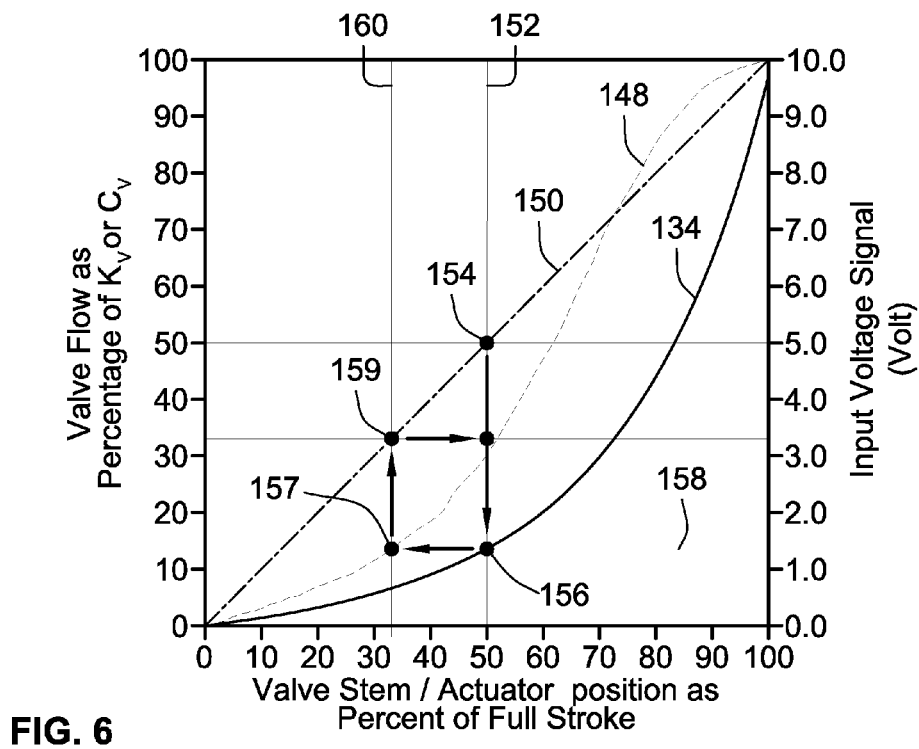
FIG. 6 is a chart showing how to correlate a control input signal to a desired stem positional signal.

FIG. 6 illustrates one method of generating the data for the lookup table for correlating the input control signal sent from the master controller 130 to the actual stem positional signal that is used to control the drive mechanism 124.

Each input control signal represents a desired valve stem position and thus a desired flow rate. This desired valve stem position is represented by vertical line 152. For this example, we will use a desired valve stem position of 50%. The intersection 154 of the vertical line 152 at the desired valve stem position and the linear theoretical response curve 150, which the programming of the master controller is based, determines the value of the input control signal for that desired valve stem position. In this instance, the input control signal from the master controller 130 would be 5.0 volts.

Next, the desired theoretical flow rate is determined based on this valve stem position. The intersection 156 of the vertical line 152 and the desired flow profile, i.e. equal percentage flow profile 134, identifies the desired percentage flow rate based on equal percentage flow profile 134 for the stem position and input control signal. In this instance, the desired percentage flow rate for the input control voltage of 5.0 volts is approximately 15%.

Next, the desired percentage flow rate of 15% is used to determine the actual valve stem position required for valve 108 based on its known flow profile 148. This actual valve stem position value is identified at the intersection 157 of horizontal line 158 representing the desired percentage flow rate of 15% and the known flow profile 148 for valve 108. In this example, the actual valve stem position is approximately 33%. Next, the actual stem positional signal that must be generated to position the valve stem 114 of the valve 108 in the proper actual stem position of 33% is determined. This actual stem positional signal is identified at the intersection 159 of vertical line 160 and the linear response curve 150. At this location, it is determined that an actual stem positional signal of approximately 3.3 volts is necessary to position the valve stem 114 of valve 108 in the proper position for it to provide the desired flow rate. This can be repeated for all desired stem positions of the desired flow curve 134 to generate the lookup table and a modified actuator response curve.

Figure 7:
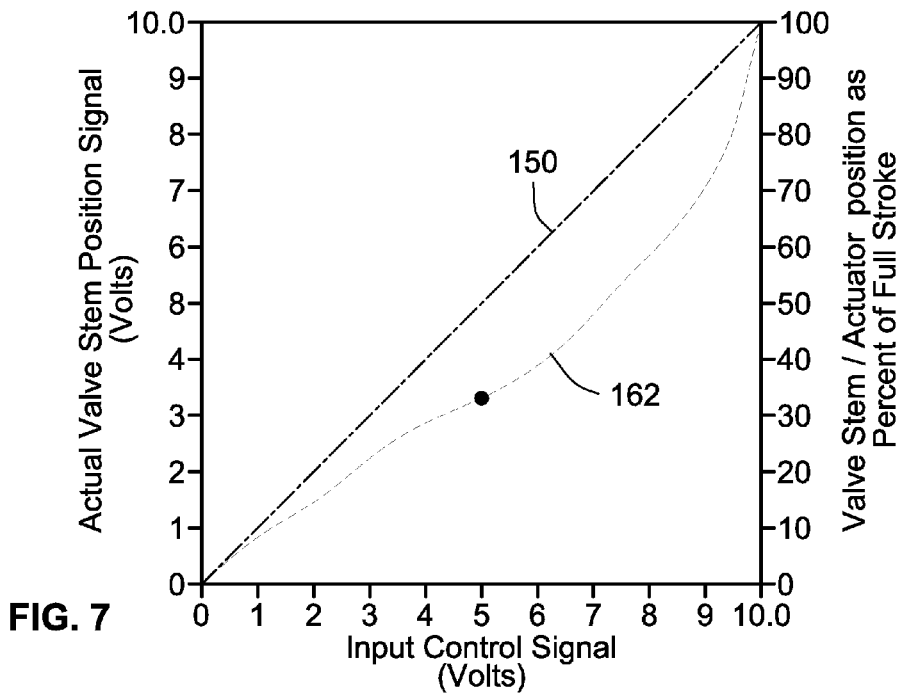
FIG. 7 is a plot of a modified valve response curve.

FIG. 7 illustrates a plot of the data that would be in the lookup table for the valve 108 having the known flow profile 148 if it is desired to have the valve 108 emulate an equal percentage valve using the prior steps.

Plot 162 represents the reprogrammed actuator response curve. Plot 162 is a plot of actual valve stem position signal (y-axis) as a function of the input control signal (x-axis). Once this plot 162 or a corresponding lookup table having sufficient data points along plot 162 is generated for a given configuration, i.e. a particular valve having a known flow profile and a particular desired flow profile on which the programming of the master controller 130 is premised, any input control signal value can be easily correlated to the actual valve stem positional signal necessary to control drive mechanism 124. Again, in the illustrated embodiment, this correlation is performed by the actuator controller 128. From FIG. 7 and plot 162 therein, it can be seen that the reprogrammed actuator response curve 162 is non-linear.

Using the above system, valve 108 can be configured to emulate essentially any desired flow profile, as long as the flow profile does not have a maximum flow that is greater than the maximum flow of valve 108.

Figure 8:
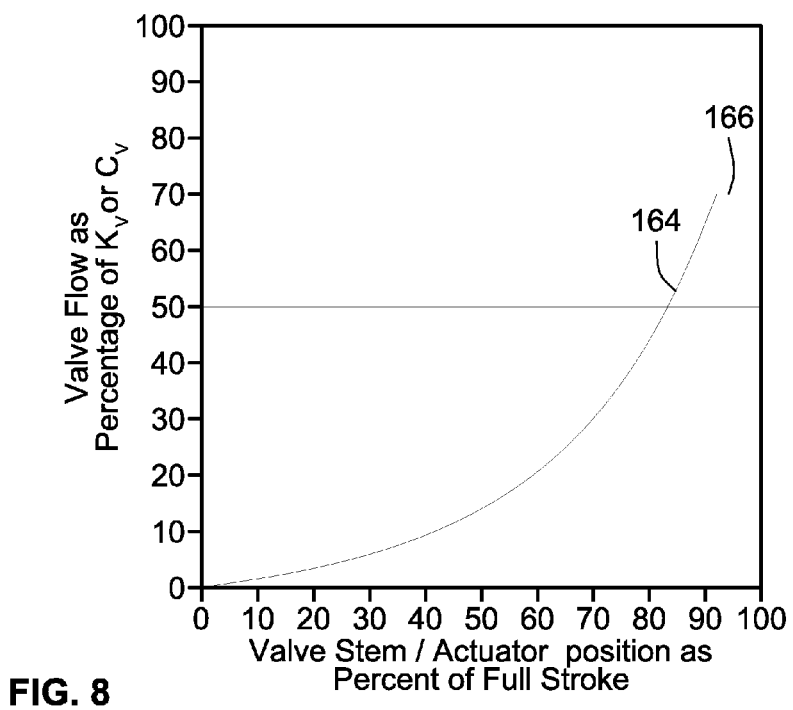
FIGS. 8 and 9 are examples of user defined desired flow profiles.

FIG. 8 illustrates a flow limiting profile 164. A flow limiting profile limits the maximum flow of a valve to some flow that is less than the full Cv/Kv of the valve. In the illustrated embodiment, the flow limiting profile 164 is a limited equal percentage curve that is capped at 70% maximum flow. More particularly, once the flow limiting profile 164 reaches 70% of maximum flow, the flow limiting profile 164 includes a horizontal section 166. In practice, this flow profile is useful to limit the maximum flow through one loop of an HVAC system in order to allow enough flow to other loops in a building while still providing an equal percentage flow profile related to the valves rated Cv/Kv. The maximum flow rate could be electronically readjusted based on varying application needs.

Figure 9:
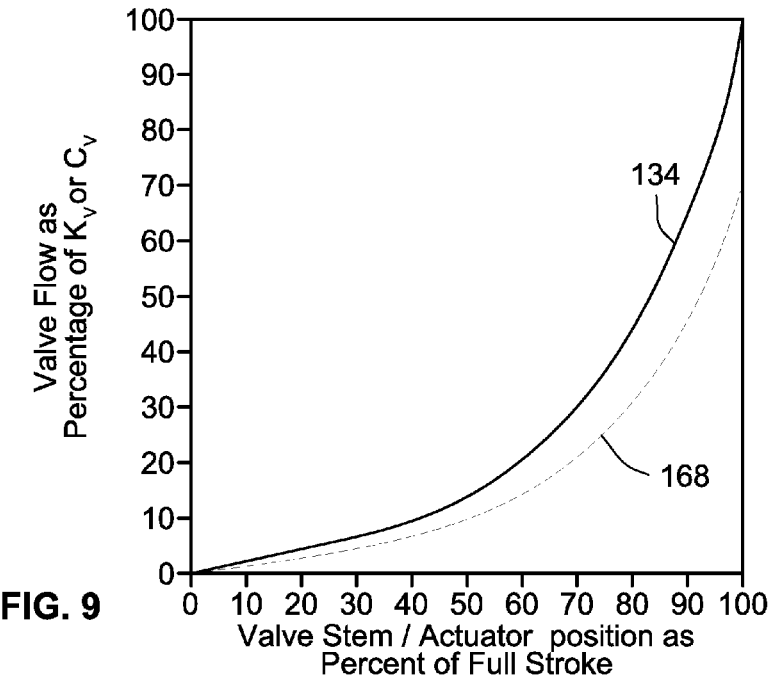

FIG. 9 illustrates a reduced rate flow profile 168. A reduced flow rate flow profile is given desired flow profile reduced by a percentage reduction factor such that the reduced rate flow profile is less than a full flow capability of the valve but still maintains substantially the same shape. In this embodiment, the reduced rate flow profile 168 is a reduced rate equal percentage flow profile. More particularly, the reduced rate flow profile 168 is equal percentage flow profile 134 multiplied by a constant percentage reduction factor of 70%. This configuration allows the flow profile to emulate an equal percentage flow profile over the valves full range, but at a reduced rate. In practice, this allows for the emulation of an oversized valve to a lesser flow Cv/Kv utilizing the reduced rate flow profile 168.

Both the flow limiting profile and the reduced rate flow profiles above could be applied to different theoretical curves, such as linear, fast-acting, etc.

The use of the system and information above allows for fully user defined flow profiles. A user can generate a user defined flow profile and then cause a valve to emulate the user defined flow profile by generate a reprogrammed actuator response curve that will allow the valve to emulate the desired flow profile.

Valve actuator 122 is preferably user programmable. More particularly, the valve actuator 122 is configured such that the user can reprogram the actuator controller 128. For instance, in the event that the actuator 122 is applied to a different type of valve, the user could reprogram the actuator controller 128, and particularly the correlation mechanism, i.e. lookup table, based on the known flow profile for the new valve. Similarly, if the same valve is being used, but the user decides to emulate a different desired flow profile, the user could reprogram the actuator controller 128 by providing, e.g. a new lookup table based on the known profile of the valve and the new desired flow profile.

Figure 10:
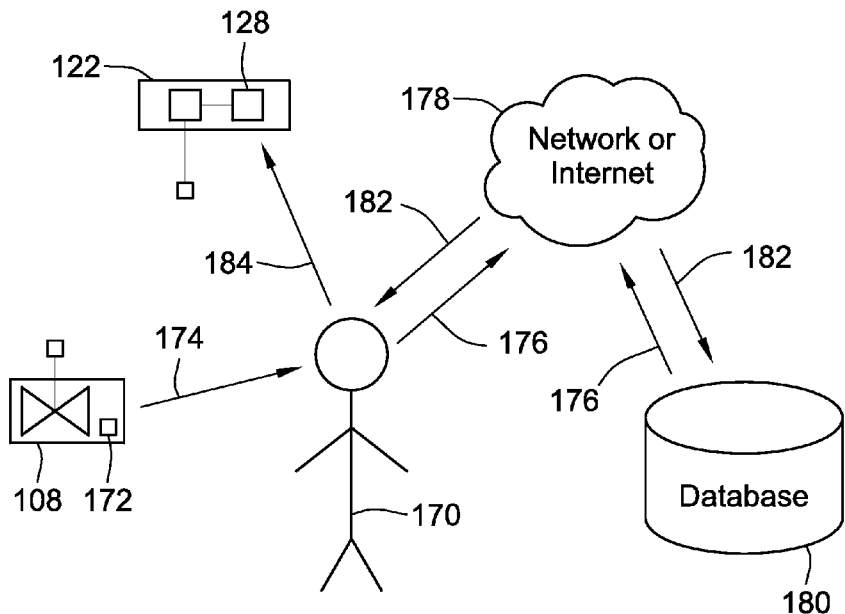
FIG. 10 is a schematic representation of how a user can reprogram a valve actuation arrangement according to the present invention.

FIG. 10 expands on the reprogramability feature. In this illustration, valve 108 includes a valve ID tag 172 that stores or represents particular information of the valve 108, such as valve part number, revision number, flow rating, production date, etc. The user can obtain the valve identification information from the valve 108, illustrated by arrow 174. The user can then use the valve identification information to request valve flow profile data from a database 180, such as a database provided by the manufacturer, over a network 178 such as the internet. The user 170 could request specific desired flow profiles or generate a user defined flow profile and the correlation mechanism, i.e. lookup table, for the specific valve and the desired flow profile, can then be sent back to the user over the network 178, illustrated by arrows 182. The user can then upload the new correlation mechanism to the actuator controller 128, illustrated by arrow 184, to reprogram the valve actuator 122.

In some embodiments, it is desirable for the valve actuator 122 to be able to store different correlation mechanisms, i.e. different lookup tables, at one time. This allows a user to switch between different preprogrammed configurations, i.e. each different lookup table, during initial setup of if system modifications are needed. For instance, if while field testing an HVAC system, it is determined that one zone of the HVAC system is not operating properly, the user can immediately switch between different modes to attempt to troubleshoot the system without being required to access new correlation mechanisms.

The use of these intelligent actuators allows for controlling low cost valves in desired ways and more accurately.

In one embodiment, the systems do not use fluid flow feedback. More particularly, actual flow through the valve 108 or pressure drop across the valve 108 is not directly used to program or reprogram the actuator controller 128 or even to control the positioning of the valve stem 114. Instead, the positioning of the valve stem 114 to obtain a desired flow rate through the valve 108 is open loop and wholly established by the programming of the master controller 130.

Figure 2:
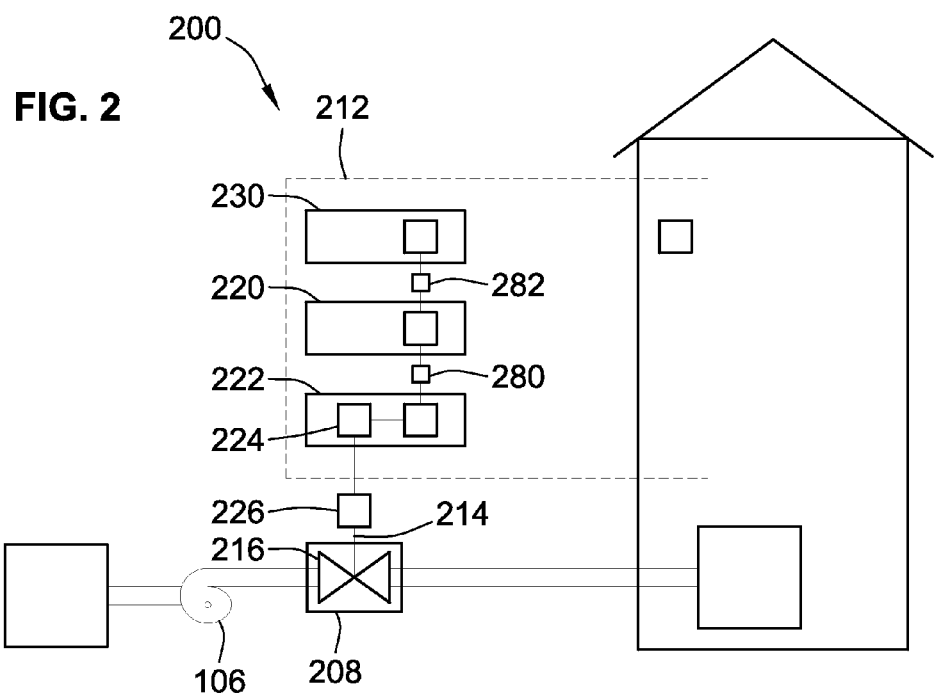
FIG. 2 is a schematic illustration of an HVAC system using a valve and a second embodiment of an actuation arrangement according to the present invention.

FIG. 2 illustrates a further embodiment of an HVAC system 200. This HVAC system 200 is similar to the prior HVAC system 100 in that it includes a valve actuation arrangement 212 configured to cause valve 208, having a known flow profile, to emulate a valve having a desired flow profile. However, this embodiment finds particular applicability for retrofitting existing HVAC systems.

In this embodiment, the valve actuation arrangement 212 includes an intermediate signal translator device 220 interposed between valve actuator 222 and master controller 230. The intermediate signal translator device 220 is preferably an independent unit that can be installed into an existing system having an existing valve actuator 222 and an existing master controller 230. The intermediate signal translator device 220 is configured to correlate the input control signal generated by the master controller 230 to an actual stem positional signal that is then sent to the valve actuator 222.

Thus, the intermediate signal translator device 220 would be programmed with the lookup table discussed above. As such, in this embodiment, the correlation functions discussed with regard to valve controller 128 would be provided by the intermediate signal translator device 220.

The intermediate signal translator device 220 will have an intermediate signal translator device output interface that will cooperate with a corresponding actuator input interface of the valve actuator 222. These two interfaces are illustrated schematically by coupling 280. This coupling 280 allows the intermediate signal translator device 220 to be operably coupled to the valve actuator 224 and output the modified valve positioning signal to the valve actuator 222. This arrangement allows the intermediate signal translator device 220 to be packaged as a separate unit wholly independent of the valve actuator 222. In this embodiment, the valve actuator 222 including its internal controller and drive unit 224 would be a separate independent unit from the intermediate signal translator device 220.

The intermediate signal translator device 220 will also have an intermediate signal translator device input interface that will cooperate with a corresponding master controller output interface of the master controller 230. These two interfaces are illustrated schematically by coupling 282. The plurality of interfaces and particularly couplings 280, 282 allow for easily retrofitting an existing system that only included master controller 230 and valve actuator 222 with the intermediate signal translator device 220 and thus be configured to properly correlate the signal generated by the master controller 230 based on a desired flow profile with a proper signal based on the actual flow profile of the valve 208.

Again, intermediate signal translator device 220 may have numerous correlation mechanisms, i.e. lookup tables or mathematical equations stored therein, such that it can operate in different modes as well as may be user reprogrammable as discussed above.

Figure 11:
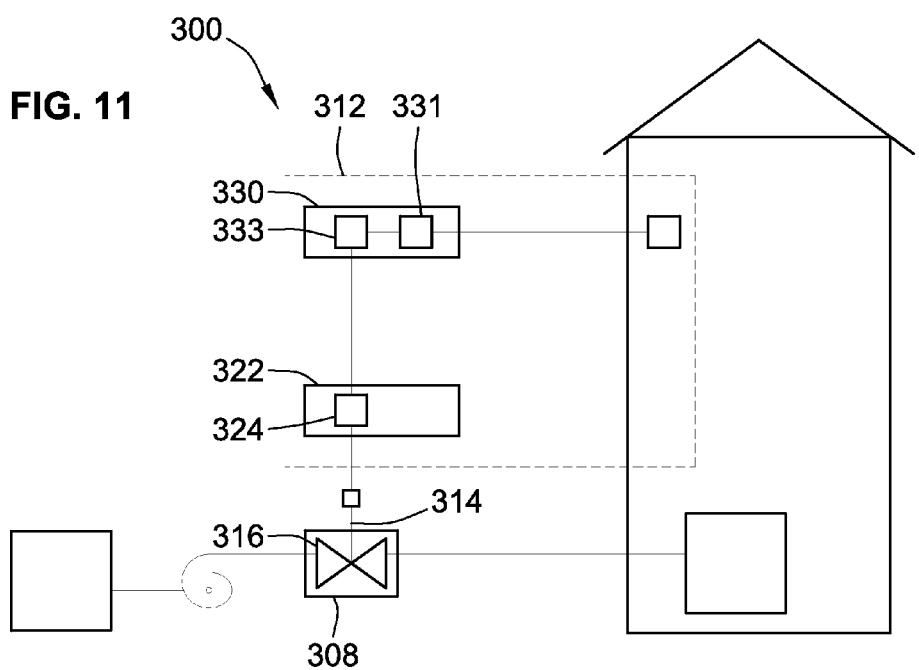
FIG. 11 is a schematic illustration of an HVAC system using a valve and a third embodiment of an actuation arrangement according to the present invention.

FIG. 11 illustrates a further embodiment of an HVAC system 300. This HVAC system 300 is similar to the prior HVAC systems 100 and 200 in that it includes a valve actuation arrangement 312 configured to cause valve 308, having a known flow profile, to emulate a valve having a desired flow profile when the desired flow profile is different than the known flow profile of valve 308.

However, in this embodiment, the correlation from the input control signal to the actual stem positional signal is performed in the master controller 330. The actual stem positional signal is then sent to the valve actuator 322. The actual stem positional signal can be analog or digital depending on the valve actuator 322 to which the master controller 330 is attached. The master controller 330 may have separate internal modules 331, 333. In the simplest form, the internal modules 331, 333 could be separate subroutines performed by the master controller 330. One module could be an input control signal module 331 that generates an input control signal based on the desired flow profile like in prior systems. However, prior to sending that input control signal to the valve actuator 322, the signal is sent to a translator module 333 that performs the correlation function and which generates the actual stem positional signal, which is subsequently sent to the valve actuator 322.

Again, the master controller 330 is preferably reprogrammable as well as able to store more than one correlation mechanism, e.g. lookup table or equivalent mathematical equation, so that it can be operated in separate modes based either on valves having different flow profiles or different desired flow profiles.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having" "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of generating a correlation table configured to correlate an input control signal to an actual stem position signal for a valve having a known flow profile, the method comprising:

receiving, from a user, a valve identifier identifying the valve having a known flow profile;

receiving, from the user, a theoretical flow profile identifier, the theoretical flow profile identifier identifying a theoretical flow profile; and outputting, to the user, a correlation table, wherein the correlation table is generated at a master controller using an input control signal and an actual stem positional signal, wherein the input control signal controls a position of a valve stem operably coupled to the valve, the input control signal being generated at the master controller based on the theoretical flow profile identifier that is other than the valve identifier identifying the valve having a known flow profile, and wherein the actual stem positional signal is generated at the master controller based on the input control signal and the known flow profile of the valve; and wherein the input control signal represents a theoretical valve stem position and the correlation table is generated by identifying a theoretical flow rate corresponding to the theoretical valve stem position according to the theoretical flow profile, identifying a known valve stem position corresponding to the theoretical flow rate according to the known flow profile of the valve, and determining the actual stem position signal corresponding to the known valve stem position.

2. The method of claim 1, wherein receiving the theoretical flow profile identifier comprises receiving user-defined theoretical flow profile information.

3. A method of controlling a valve actuator for a valve having a known flow profile, the method comprising:
receiving an input control signal, the input control signal representing a theoretical valve stem position corresponding to a theoretical flow output generated based on a theoretical flow profile, the theoretical flow profile being other than the known flow profile of the valve;
correlating the theoretical flow output to a known valve stem position according to the known flow profile of the valve and further correlating the known valve stem position to a known stem positional signal, the known stem positional signal indicating a position of a valve stem operably coupled to the valve that results in the theoretical flow output; and
based on the correlation, generating the known stem positional signal.

4. The method of claim 3, wherein the step of receiving the input control signal is performed by a linear signal.

5. A method of operating a valve actuator arrangement for a valve having a known profile, the method comprising:
receiving, during a first mode, a first valve stem control signal generated based on a theoretical flow profile, the first valve stem control signal representing a first theoretical valve stem position;
correlating, during the first mode, the first theoretical valve stem position to a first actual valve stem position based on the known profile;
correlating, during the first mode, the first actual valve stem position to a first actual valve stem positional signal based on the known profile;
generate, during the first mode, the first actual valve stem positional signal based on the correlation of the first actual valve stem positional signal to the first actual valve stem position; and
adjust, during the first mode, a position of the valve based on the first actual valve stem positional signal, wherein the adjustment facilitates first theoretical flow characteristics associated with the theoretical flow profile for the valve.

6. The method of claim 5, further comprising:
receiving, during a second mode, a second valve stem control signal generated based on the theoretical flow profile, the second valve stem control signal representing a second theoretical valve stem position;
correlating, during the second mode, the second theoretical valve stem position to a second actual valve stem position based on the known profile;
correlating, during the second mode, the second actual valve stem position to a second actual valve stem positional signal based on the known profile;
generate, during the second mode, the second actual valve stem positional signal based on the correlation of the second actual valve stem positional signal to the second actual valve stem position; and
adjust, during the second mode, the position of the valve to another position based on the second actual valve stem positional signal, wherein the adjustment facilitates second theoretical flow characteristics associated with the theoretical flow profile for the valve.

7. The method of claim 6, further comprising:
dynamically switching from the first mode to the second mode to achieve the theoretical flow characteristics.

* * * * *